(12) United States Patent
Fossaert (10) Patent No.: US 11,975,462 B2
(45) Date of Patent: May 7, 2024

(54) COOLING SYSTEM FOR MOULDS (71) Applicant: Billio Pty Ltd, North Adelaide (AU)

(72) Inventor: Laurent Fossaert, North Adelaide (AU)

(73) Assignee: BILLIO PTY LTD, Victoria (AU)

(*) Notice: Subject to any disclaimer, the term of this patent is extended or adjusted under 35 U.S.C. 154(b) by 0 days.

(21) Appl. No.: 16/486,510

(22) PCT Filed: Feb. 16, 2018

(86) PCT No.: PCT/AU2018/050130
§ 371 (c)(1),
(2) Date: Aug. 16, 2019

(87) PCT Pub. No.: WO2018/148806
PCT Pub. Date: Aug. 23, 2018

(65) Prior Publication Data
US 2020/0230844 A1 Jul. 23, 2020

(30) Foreign Application Priority Data
Feb. 16, 2017 (AU) ................. 2017900505

(51) Int. Cl.
*B29C 33/04* (2006.01)
*B29C 45/73* (2006.01)

(52) U.S. Cl.
CPC .......... *B29C 33/04* (2013.01); *B29C 45/7306* (2013.01); *B29C 45/7312* (2013.01)

(58) Field of Classification Search
CPC .. B29C 33/04; B29C 45/7306; B29C 45/7312
(Continued)

(56) References Cited

U.S. PATENT DOCUMENTS 3,748,866 A 7/1973 Heider et al.
4,177,238 A 12/1979 Allen
(Continued)

FOREIGN PATENT DOCUMENTS

DE 3827398 A1 2/1990
DE 102007030802 B3 12/2008
(Continued)

OTHER PUBLICATIONS

Harwood (Experimental organic chemistry: principles and practice. WileyBlackwell. pp. 41-42). (Year: 1989).*
(Continued)

*Primary Examiner* — Philip C Tucker
*Assistant Examiner* — Hana C Page
(74) *Attorney, Agent, or Firm* — Buchanan Ingersoll & Rooney PC (57) ABSTRACT

Evaporative cooling system (1) having a closed fluid circuit operating at below atmospheric pressure to remove heat from a mould assembly (3). The system (1) includes a cooling fluid supply source (5) connected to a mould assembly (3) to supply cooling fluid in liquid phase to hollow cooling chambers (13) of the mould assembly (3). Heat is removed by evaporation of the cooling fluid upon contact with the internal wall surfaces (29) of the cooling chamber (13). The rate of heat removal is regulated by controlling flow of fluid and/or pressure within the system in response to a) temperature measurements in the mould assembly (3), and/or b) pressure measurements with the fluid circuit, such that the cooling chamber (13) remains substantially free of cooling fluid in the liquid phase with cooling fluid entering the chamber (13) evaporating upon contact with the internal wall surfaces of the chamber (13).

16 Claims, 4 Drawing Sheets

(58) Field of Classification Search
USPC .................................................... 264/40.6
See application file for complete search history.

(56) References Cited

U.S. PATENT DOCUMENTS

| | | | |
|---|---|---|---|
| 4,623,497 A | | 11/1986 | Waters |
| 4,690,789 A | | 9/1987 | Ritchie et al. |
| 5,203,681 A | * | 4/1993 | Cooper .................. F04D 7/065 |
| | | | 417/360 |
| 6,312,628 B1 | | 11/2001 | Wieder et al. |
| 6,638,455 B1 | | 10/2003 | Bodmer et al. |
| 7,425,294 B2 | | 9/2008 | Grimmer et al. |
| 8,501,060 B2 | | 8/2013 | Johnson |
| 8,561,219 B2 | | 10/2013 | Metcalf et al. |
| 2001/0005063 A1 | | 6/2001 | Neter |
| 2013/0154143 A1 | * | 6/2013 | Wallinger ................ H05B 3/28 |
| | | | 264/40.1 |
| 2013/0220572 A1 | | 8/2013 | Rocco et al. |
| 2014/0166262 A1 | | 6/2014 | Yoshiara et al. |

FOREIGN PATENT DOCUMENTS

| | | |
|---|---|---|
| EP | 1785206 A1 | 5/2007 |
| EP | 1870218 A1 | 12/2007 |
| JP | S59225853 A | 12/1984 |
| JP | H0474620 A | 3/1992 |
| JP | H05237952 A | 9/1993 |
| JP | H0819852 A | 1/1996 |
| JP | H08200915 A | 8/1996 |
| JP | 2012121245 A | 6/2012 |
| KR | 20120034398 A | 4/2012 |
| WO | 98/24573 A1 | 6/1998 |
| WO | 98/25746 A1 | 6/1998 |
| WO | 2005123357 A2 | 12/2005 |
| WO | 2015053179 A1 | 4/2015 |
| WO | 2015189729 A1 | 12/2015 |

OTHER PUBLICATIONS

Kouchi (English Translation of JPS6353016). (Year: 1988).*
English Translation of Nishiyama (JP2003181866). (Year: 2003).*
International Search Report for PCT/AU2018/050130 dated Apr. 19, 2018.
Written Opinion of the International Searching Authority for PCT/AU2018/050130 dated Apr. 19, 2018.

* cited by examiner

COOLING SYSTEM FOR MOULDS

RELATED APPLICATION

This application is a national stage filing under 35 U.S.C. § 371 of international application number PCT/AU2018/050130, filed Feb. 16, 2018, which is incorporated by reference herein in its entirety.

FIELD OF THE INVENTION

The invention relates to a system for cooling moulds. More specifically the present invention relates to an evaporative cooling system for removing heat from a mould assembly.

BACKGROUND TO THE INVENTION

Thermoplastic polymers are widely used for high volume manufacturing of components. During the manufacturing process the polymer is heated until flowable and then moulded into shape in a temperature regulated mould having a core and cavity which come together to provide a resulting moulding space where the polymer is solidified in the desired shape. Various processes can be utilised including injection moulding, extrusion blow moulding, injection blow moulding, etc depending on the final shape required. These moulding processes require a temperature regulated mould to cool the polymer until it solidifies so that it can then be extracted from the moulding space Since polymers are poor conductors of heat, the design of the cooling system for a mould is important in order to achieve low cycle times. Known cooling techniques rely on a high volume of cooling fluid in liquid phase flowing through channels in mould plates, mould cores and mould cavities in a similar way to a heat exchanger. Limitations in machining technologies and tools almost always oblige designers to compromise on the design of the cooling system of a mould. Recent developments in laser sintering have led to improvements of the design of complex cooling channels allowing for 3D shaped channels and small diameters, although they still rely on turbulent flow of cooling liquid to achieve heat exchange.

Injection moulding is one technique where mould temperature influences most steps in the manufacturing cycle. The molten polymer is injected dynamically under relatively high pressure into the moulding space of a temperature regulated mould until it is almost completely full. This step is followed by packing, where the polymer is kept under relatively high pressure to completely fill the moulding space and compensate for the changes in the polymer specific volume (change in density when cooling). The polymer is then allowed to cool to below ejection temperature before being extracted from the mould. The ejection temperature is dictated by the hottest section/wall of polymer, which is often located in areas where it is difficult to implement sufficient cooling channels. Beside cycle time considerations, injection moulded parts quality can also be influenced by the design of the mould cooling system. During the cooling process, changes in the morphology of the polymer can occur, and uneven temperatures can lead to issues such as deformation, warpage and poor mechanical properties (in built stress). For crystalline and semi-crystalline polymers the rate of crystallisation can vary according to the wall thickness and the mould temperature. Any 'hot spots' in the filled moulding space will result in difference in crystallinity and create internal stresses that can lead to part deformation (warpage), environmental stress cracking (ESCR), mechanical weaknesses and deformation in time due to stress release (annealing, moisture intake). These hot spots are difficult to avoid in cases of complex moulding space geometries having equally complex cooling channel geometries in the mould core and mould cavity where turbulent coolant flow can vary and equidistant regulating channels can not be implemented.

Injection moulds are most often connected to one or more temperature regulating devices that supply a quantity of fluid to cooling channels. Since the heat exchange is a function of the flow characteristic of the coolant fluid in the cooling channels of the mould, it is difficult to accurately 'size' such regulating devices. The fall-back position is to 'over engineer' the solution to ensure adequate heat transfer is achieved, leading to energy waste.

Another issue with turbulent flow cooling can be observed when operating moulds at low temperatures. During the start-up phase the coolant fluid is circulated in the cooling channels of the mould whilst no thermal energy from the molten polymer is introduced. This can result in a mould cavity/core temperature below that of the temperature expected during production which leads to variable moulded part quality that is often not acceptable, until the mould reaches a thermal equilibrium. An injection moulding process is often not stable until this thermal equilibrium is reached and issues both at start up, with parts sticking to the mould, being difficult eject, mould sweating, size issues, and at equilibrium with hot spots and deformation creating complex situations for the process operators/setters. Other moulding processes such as extrusion blow moulding also cause similar problems until the mould components, blow pins, blow moulds, etc have reached thermal equilibrium.

Evaporative cooling is a potential solution to the issues with turbulent flow cooling. Numerous attempts have been made, using a variety of fluids or refrigerant, to implement efficient cooling/temperature regulation for thermoplastic moulds. Evaporative cooling using water as a coolant is particularly attractive for many reasons; water is inexpensive, non-toxic, non-pollutant, in good supply, but more importantly its latent heat of vaporisation is the highest amongst common fluids and gases.

Several evaporative cooling systems, for moulds, using water have been developed over the years. However most still have issues accurately regulating mould temperature around a desired set point especially at lower temperatures typically used for moulding polyolefin resins (PE, PP) and PET or in cases where low levels of energy are to be absorbed (small parts/components moulding). In some known systems the coolant temperature dictates the mould cavities and cores temperatures because the pressure in the mould is essentially a function of the water vapour pressure at the set temperature. Another drawback of some known cooling systems is the inability to control the quantity of water vaporised at any one time, since known systems rely on the presence of water in the cavities/cooling channels, therefore it is not possible to control the cooling rate. This can be a problem with crystalline polymers where the rate of crystallisation during cooling directly impacts the mechanical properties and deformation (warpage) of the moulded parts. A further issue with some existing systems is the accumulation of cooling fluid in liquid phase at the base of the mould core and mould cavity as continuously wet/submerged cooling chamber surfaces will cool more efficiently and at a different rate than surfaces with are normally dry.

It would be desirable to provide an evaporative cooling system for removing heat from a mould assembly and an associated method which alleviates at least one of the problems with the prior art.

Any discussion of documents, devices, acts or knowledge in this specification is included to explain the context of the invention. It should not be taken as an admission that any of the material formed part of the prior art base or the common general knowledge in the relevant art on or before the priority date of the claims herein.

SUMMARY OF THE INVENTION

In accordance with a first aspect of the invention, there is provided an evaporative cooling system connectable to a mould assembly to remove heat therefrom, the system including:
- a cooling fluid supply source,
- at least one cooling fluid supply line connected to the cooling fluid supply source, the cooling fluid supply line being connectable to a mould assembly to thereby supply cooling fluid in liquid phase from the cooling fluid supply source to one or more cooling fluid cavities of the mould assembly, heat from the mould assembly being removed by evaporation of the cooling fluid upon contact with a surface of the one or more cooling fluid cavities,
- at least one cooling fluid return line and a heat exchanger connected thereto, the cooling fluid return line being connectable to the cooling fluid cavities of the mould assembly to thereby transfer cooling fluid evaporated in the mould assembly to the heat exchanger,
- the heat exchanger being operatively connected to the cooling fluid supply source to return cooling fluid condensed in the heat exchanger to the cooling fluid supply source,
- wherein in use, the cooling fluid supply source, at least one cooling fluid supply line, one or more cooling fluid cavities, at least one cooling fluid return line, and heat exchanger collectively define a closed fluid circuit through which cooling fluid circulates,
- and wherein the system further includes:
- one or more temperature sensors for measuring the temperature of the mould assembly and/or the temperature of the cooling fluid,
- a vacuum generator for providing below atmospheric pressure within the fluid circuit,
- a vacuum measuring device for measuring the pressure within the fluid circuit, and
- a controller for regulating the rate of heat removal from the mould assembly,
- and wherein in use, the controller regulates the rate of heat removal from the mould assembly by controlling flow of fluid and/or pressure within the fluid circuit in response to a) temperature measurements from the one or more temperature sensors, and/or b) pressure measurements from the vacuum measuring device, such that the one or more cavities remain substantially free of cooling fluid in the liquid phase with cooling fluid entering the one or more cooling fluid cavities evaporating upon contact with the surface of the one or more cooling fluid cavities.

In accordance with another aspect of the invention, there is provided an evaporative cooling system in combination with a mould assembly, the combination including a closed fluid circuit through which cooling fluid circulates, the circuit including:
- a cooling fluid supply source for storing cooling fluid,
- one or more cooling fluid cavities of the mould assembly,
- at least one cooling fluid supply line for supplying cooling fluid in liquid phase from the cooling fluid supply source to one or more cooling fluid cavities of the mould assembly, heat from the mould assembly being removed by evaporation of the cooling fluid upon contact with a surface of the one or more cooling fluid cavities,
- at least one cooling fluid return line and a heat exchanger, the cooling fluid return line transferring cooling fluid evaporated in the mould assembly to the heat exchanger, the heat exchanger condensing the evaporated cooling fluid,
- a connecting line between the heat exchanger and the cooling fluid supply source, the cooling fluid condensed in the heat exchanger being returned to the cooling fluid supply source via the connecting line,
- the system including:
- one or more temperature sensors for measuring the temperature of the mould assembly and/or the temperature of the cooling fluid,
- a vacuum generator for providing below atmospheric pressure within the closed fluid circuit,
- a vacuum measuring device for measuring the pressure within the closed fluid circuit, and
- a controller for regulating the rate of heat removal from the mould assembly by controlling flow of fluid and/or pressure within the closed fluid circuit in response to temperature and pressure measurements such that, in use, the one or more cooling fluid cavities remain substantially free of cooling fluid in the liquid phase with cooling fluid entering the one or more cooling fluid cavities evaporating upon contact with the surface of the one or more cooling fluid cavities.

The vacuum generator is preferably a vacuum pump which in use, evacuates the closed fluid circuit to provide a sub atmospheric pressure in the circuit between approximately 1 mbar (100 pa) and 950 mbar. Pressure within the circuit is preferably controlled by the controller via operation of the vacuum pump.

The cooling fluid supply source is preferably a tank containing cooling fluid. The evaporative cooling system may further include at least one cooling fluid pump for pumping cooling fluid from the cooling fluid supply tank to the cooling fluid supply line. The flow of fluid within the circuit being preferably controlled by the controller via operation of the cooling fluid pump. Further, the cooling fluid pump may be submerged in cooling fluid contained in the cooling fluid supply tank or located below the fluid supply tank. In one embodiment, two pumps may be provided with a first pump located in the supply tank acting to prime a second pump located underneath the tank.

The mould assembly preferably includes a first mould part having a mould core plate defining a moulding surface on a first side. A second side of said mould core plate defines said surface of the one or more cooling fluid cavities. The mould assembly may also include a second mould part having a mould cavity plate.

The first mould part and the second mould part of the mould assembly may each further include a distribution manifold. The one or more cooling fluid supply lines supplying cooling fluid to the one or more cooling fluid cavities of the first mould part and the second mould part via the distribution manifold of each part. The distribution manifold of the first mould part is preferably at least in part housed within the first mould part with the cooling fluid cavities being defined between the distribution manifold of the first mould part and said mould core plate of the first mould part.

The distribution manifold preferably includes a plurality of hollow stem members for channeling cooling fluid supplied to the distribution manifold. In this regard, each stem member preferably includes a series of outlets through which cooling fluid can be dispersed into the cooling fluid cavities. The series of outlets are preferably distributed along an elongate length of each stem member.

The mould assembly may further include at least one drain port for draining residual cooling fluid in the cooling fluid cavities which has not vaporised. The drain port is preferably located in a sidewall of the first mould part and may be connected to the cooling fluid supply tank via a drain line.

In a particularly preferred embodiment, the heat exchanger is preferably connected to a chilled water supply. Further, the system may further include a cold trap for preventing evaporated cooling fluid from entering the vacuum pump during evacuation of the closed fluid circuit.

Preferably, at least one of the temperature sensors is a thermocouple positioned to measure the temperature of the surface of the one or more cooling fluid cavities.

In accordance with another aspect of the invention, there is provided a cooling fluid distribution manifold for a mould assembly, the distribution manifold being connectable to an evaporative cooling system to remove heat from the mould assembly, the manifold being at least in-part insertable into a first mould part of the mould assembly, the manifold including a plurality of hollow stem members defining a series of passageways for cooling fluid supplied to the manifold from the cooling system, wherein each stem member includes a series of outlets through which cooling fluid in liquid phase is dispensable into one or more cooling fluid cavities of the mould assembly.

In accordance with another aspect of the invention, there is provided a method of removing heat from a mould assembly, the method including the steps of:

provided a closed fluid circuit for cooling fluid to circulate therethrough, the closed fluid circuit including:
at least one cooling fluid supply source for storing cooling fluid,
a cooling fluid supply line connected to the cooling fluid supply source,
one or more cooling fluid cavities of a mould assembly connected to the cooling fluid supply line,
at least one cooling fluid return line connected to the one or more cooling fluid cavities,
a heat exchanger connected to the cooling fluid return line, and
a connecting line between the heat exchanger and the cooling fluid supply source;
connecting the cooling fluid supply line to the mould assembly;
supplying cooling fluid in liquid phase from the cooling fluid supply source to one or more cooling fluid cavities of the mould assembly via the cooling fluid supply line, heat from the mould assembly being removed by evaporation of the cooling fluid upon contact with a surface of the one or more cooling fluid cavities,
transferring cooling fluid evaporated in the mould assembly to a heat exchanger via the cooling fluid return line, the heat exchanger condensing the evaporated cooling fluid,
returning cooling fluid condensed in the heat exchanger to the cooling fluid supply source via the connecting line connected to the cooling fluid supply source, measuring the temperature of the mould assembly or the cooling fluid using one or more temperature sensors,
providing below atmospheric pressure within the closed fluid circuit with a vacuum generator,
measuring the pressure within the closed fluid circuit using a vacuum measuring device, and
regulating the rate of heat removal from the mould assembly by controlling flow of fluid and/or pressure within the closed fluid circuit in response to temperature and pressure measurements such that, the one or more cooling fluid cavities remain substantially free of cooling fluid in the liquid phase with cooling fluid entering the one or more cooling fluid cavities evaporating upon contact with the surface of the one or more cooling fluid cavities.

To assist the further understanding of the invention, reference will now be made to the accompanying drawings which illustrate the preferred embodiments. It is to be appreciated that these embodiments are given by way of example only and the invention is not to be limited by these examples.

DESCRIPTION OF PREFERRED EMBODIMENTS

Figure 1:
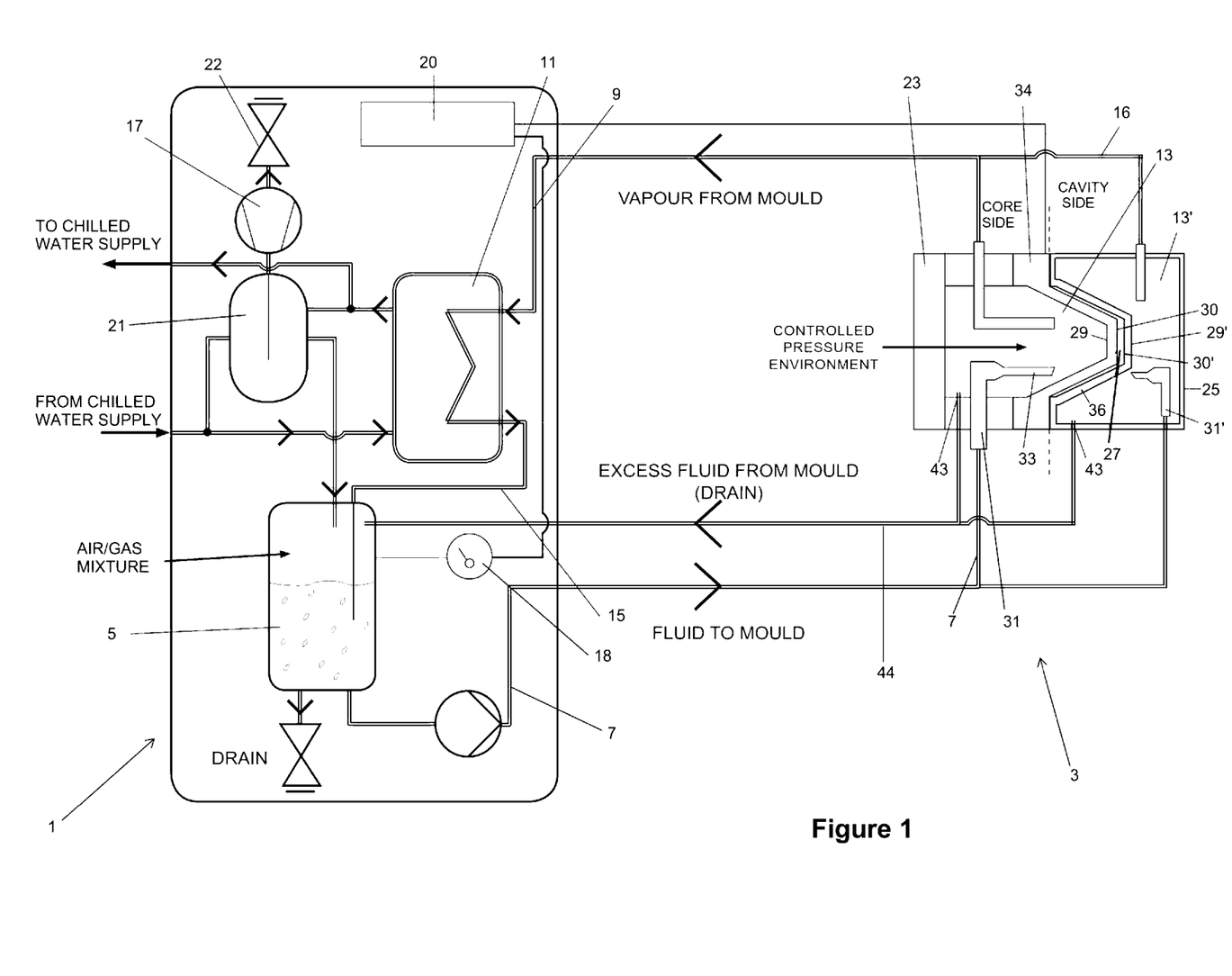
FIG. 1 is a diagrammatic representation of the evaporative cooling system connected to a mould assembly to remove heat therefrom, in accordance with an embodiment of the invention.

With reference to the accompanying drawings there is shown an evaporative cooling system 1 for removing heat from a mould assembly 3. In FIG. 1 the cooling system 1 is shown connected to the mould assembly 3. The system 1 includes a cooling fluid supply source which may be in the form of a cooling fluid supply tank 5 containing a supply of cooling fluid in liquid phase. The cooling fluid is preferably water as its latent heat of vaporisation is the highest amongst common fluids and gases.

The cooling system 1 further includes at least one cooling fluid supply line 7 connected to the supply tank 5. The cooling fluid supply line 7 is connectable to the mould assembly 3 to thereby supply cooling fluid in liquid phase from the supply tank 5 to one or more cooling fluid cavities/channels 13 of the mould assembly 3. The cooling system 1 further includes at least one cooling fluid return line 9 and a heat exchanger 11. The cooling fluid return line 9 being connectable to one or more cooling fluid cavities 13 of the mould assembly 3. The heat exchanger 11 is operatively connected to the cooling fluid return line 9 thereby enabling cooling fluid evaporated in the mould assembly 3 to be transferred to the heat exchanger 11. In this respect heat from the mould assembly 3 is removed by evaporation of the cooling fluid upon contact with the surface of the one or more fluid cavities 13.

The heat exchanger 11 is also operatively connected to the supply tank 5 thereby enabling the return of cooling fluid condensed in the heat exchanger 11 to the supply tank 5. In this regard, a connecting line 15 may be provided between the heat exchanger 11 and supply tank 5 to facilitate the return of cooling fluid to the supply tank 5.

When the cooling fluid supply and return lines 7, 9 of the evaporative cooling system 1 are connected to a mould assembly 3, the supply tank 5, cooling fluid supply line 7, cooling fluid cavities 13, fluid return line 9, heat exchanger 11 and connecting line 15 collectively define a closed fluid circuit through which cooling fluid is able to circulate.

The one or more temperatures sensors may each be in the form of a thermocouple 16 for measuring the temperature of the mould assembly 3, and the vacuum generator may be in the form of a vacuum pump 17 for providing below atmospheric pressure within the fluid circuit. Further, the vacuum measuring device may be in the form of a vacuum gauge 18 for measuring the pressure within the fluid circuit, for example within the supply tank 5. The cooling system 1 further includes a controller 20, for example a PID controller, for regulating the rate of heat removal from the mould assembly 3. In this respect, heat from the mould assembly 3 is removed by evaporation of the cooling fluid upon contact with a wall surface 29 of the one or more cooling fluid cavities 13. The controller 20 is able to regulate the rate of heat removal by controlling the flow of fluid and/or pressure within the closed fluid circuit in response to temperature and pressure measurements from the one or more thermocouples 16 and vacuum gauge 18, respectively. In operation, the controller 20 regulates the rate of heat removal such that the cooling fluid cavities/channels 13 of the mould assembly 3 remain substantially free of cooling fluid in the liquid phase with cooling fluid entering the fluid cavities 13 evaporating upon contact with the walls 29 of the cooling fluid channels/cavities 13.

The vapour pressure of the cooling fluid, which is preferably water, is the pressure at which water vapour is in thermodynamic equilibrium with its condensed state at a given temperature in a closed system. At a pressure higher than the vapour pressure, condensation occurs. For this reason, it is important that, during the evacuation and/or priming of the cooling system 1, the temperature of the water in the supply tank 5 and/or cold trap and/or heat exchanger 11 is lower than the temperature at which vaporisation of the water occurs. For example, if the desired pressure within the cooling system 1 is 23 mbar, the temperature of the water in the supply tank 5 and/or cold trap and/or heat exchanger 11 should be kept below 20° C. to avoid evaporation as the vapour pressure of water at a temperature of 20° C. is 23.4 mbar (2340 Pa).

The cooling system 1 may further include at least one cooling fluid pump 19 for pumping cooling fluid within the fluid circuit. In this respect, the fluid pump 19 may be positioned in the cooling fluid supply line 7 or be submerged in cooling fluid contained in the supply tank 5. Operation of the cooling fluid pump 19 is preferably controlled by the controller 20 to thereby control the flow of fluid within the circuit.

Operation of the vacuum pump 17 is also preferably controlled by the controller 20 with the vacuum pump 17 being controlled to evacuate the closed fluid circuit to provide a sub atmospheric pressure in the circuit. The cooling system 1 is thereby advantageously able to regulate the rate of cooling by selective operation of the vacuum pump 17, fluid pump 19 and chilled water supply to the heat exchanger 11 in response to temperature and pressure measurements such that the temperature of the cooling fluid in the supply tank 5 is lower than the temperature at which vaporisation of the cooling fluid occurs and that the cooling fluid does not boil in the cooling fluid supply line(s) 7 and will instead only evaporate when in contact with the wall surfaces 29 of the cooling fluid cavities 13. The cooling system 1 may also further include a cold trap 21 for preventing evaporated cooling fluid from entering the vacuum pump 17 during evacuation of the closed fluid circuit.

The mould assembly 3 includes a first mould part 23 providing a mould core side and a second mould part 25 providing a mould cavity side. The mould core side and mould cavity side define therebetween a moulding space 27 within which a hot polymer may be introduced to form a moulded article. In an alternative embodiment, the first mould part 23 may provide the mould cavity side and the second mould part 25 may provide the mould core side. With reference to FIG. 1, the first mould part 23 includes a mould core plate 34 defining a moulding surface 30 on a first side. The moulding surface 30 providing a side wall of the moulding space 27. A second opposite side of said mould core plate 34 defines a wall surface 29 of the one or more cooling fluid cavities 13 housed within the first mould part 23. Likewise, the second mould part 25 preferably includes a corresponding mould cavity plate 36 defining a moulding surface 30' on a first side. The moulding surface 30' providing an opposing side wall of the moulding space 27. A second opposite side of the mould cavity plate 36 defines a wall surface 29' of the one or more cooling fluid cavities 13' housed within the second mould part 25.

Figure 2:
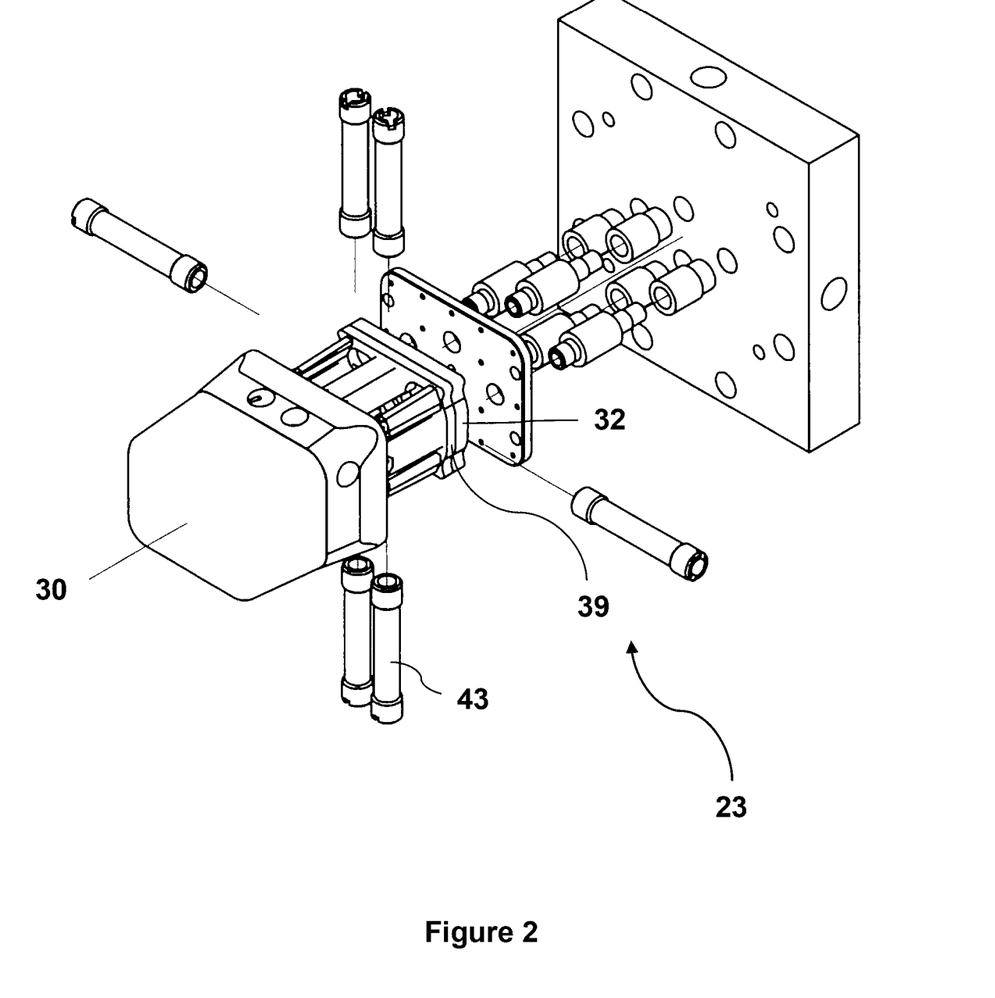
FIG. 2 is an exploded perspective view of various components of a mould core side of a mould assembly in accordance with an embodiment of the invention. The mould core side of the mould assembly including a cooling fluid distribution manifold connectable to the evaporative cooling system shown in FIG. 1 to remove heat from the mould assembly.

With reference to FIGS. 1 and 2, the first mould part 23 further includes a cooling fluid distribution manifold 31 which may be 3D printed. The distribution manifold 31 supplies cooling fluid in liquid phase to the one or more cooling fluid cavities 13 of the first mould part 23. In this respect, the distribution manifold 31 via a base plate 32 connects the first mould part 23 to the cooling fluid supply line 7 of the cooling system 1. The cooling fluid cavities 13 are defined between the distribution manifold 31 and the wall surface 29 of the cooling fluid cavities/channels 13, the wall surface 29 being the opposite side of the mould core plate 34 to the external moulding surface 30. Likewise, the second mould part 25 is provided with a corresponding distribution manifold 31' which supplies cooling fluid in liquid phase to the one or more fluid cavities of the second mould part 25.

Figure 3A:
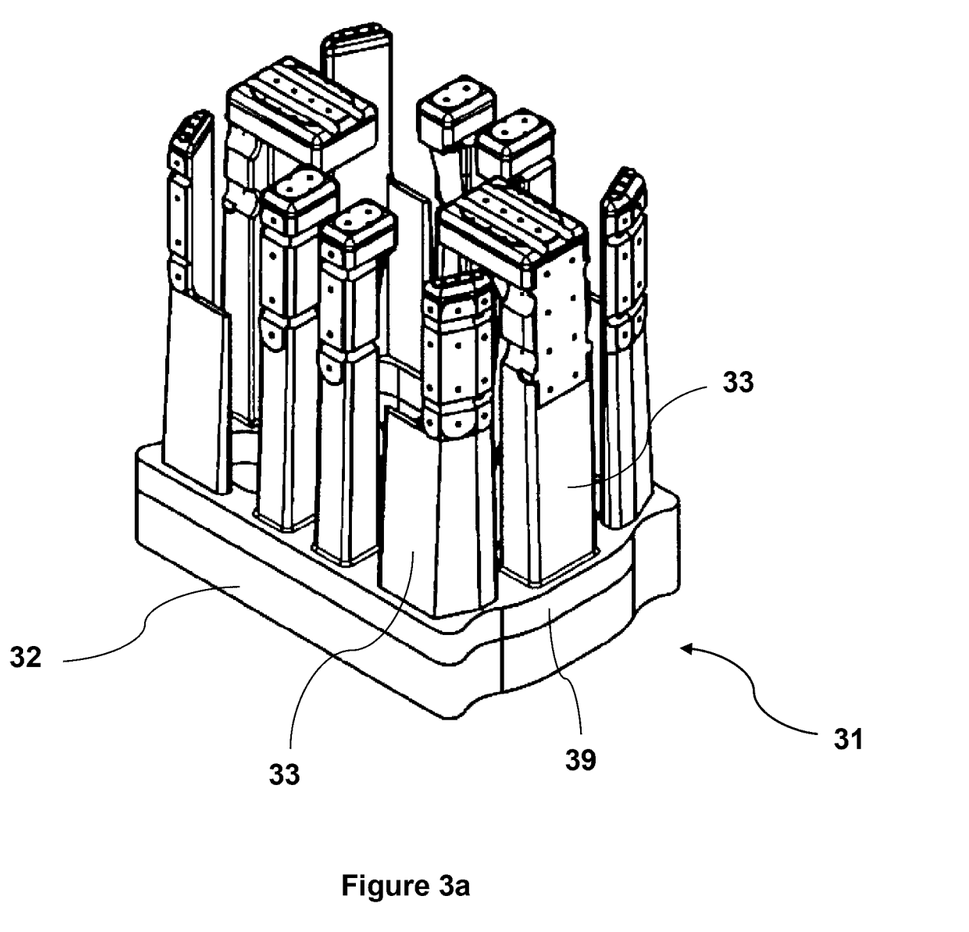
FIG. 3a is a perspective view of the cooling fluid distribution manifold of the mould core side illustrated in FIG. 2.
Figure 3B:
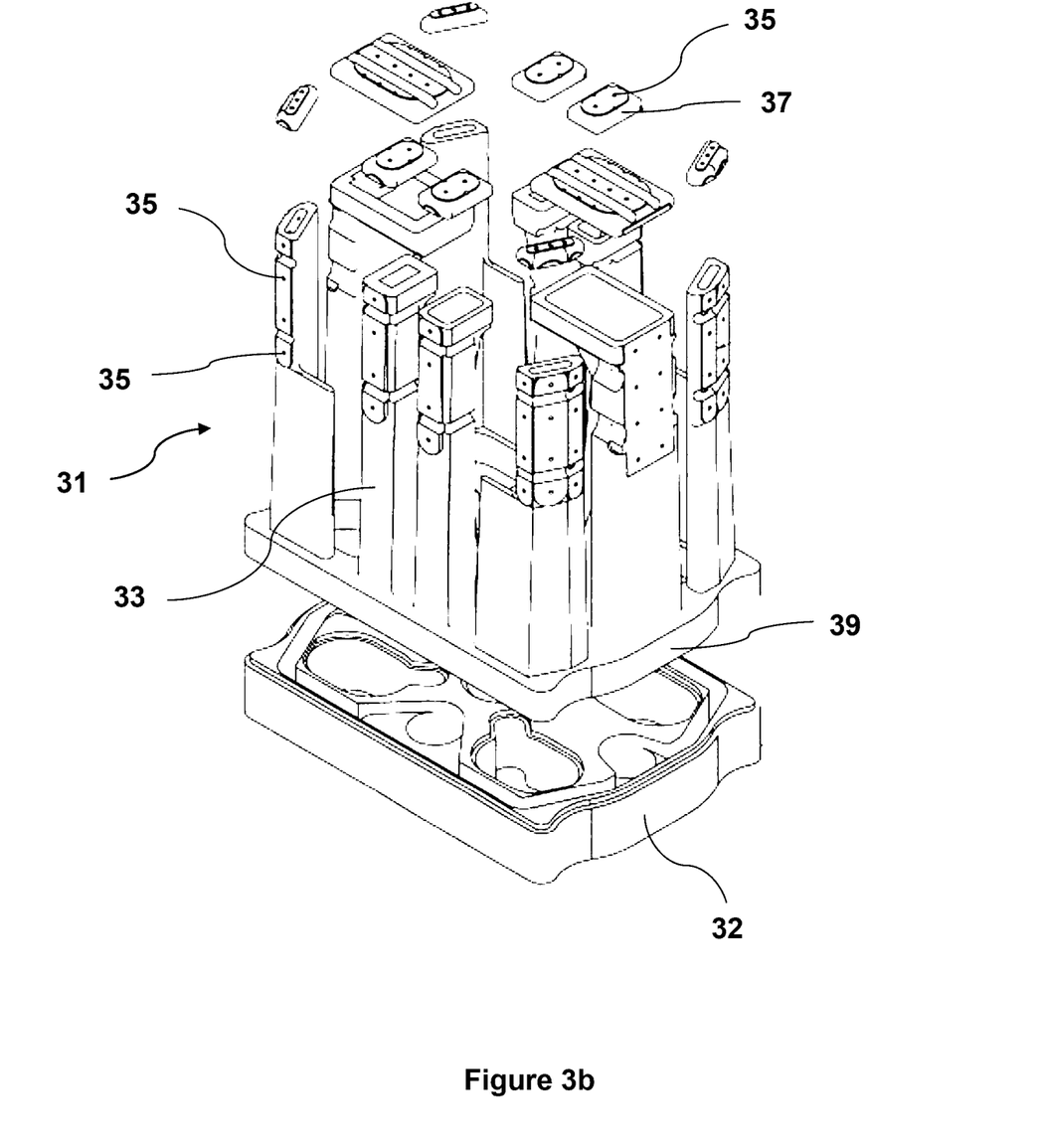
FIG. 3b is an exploded perspective view of the cooling fluid distribution manifold illustrated in FIG. 3a including an underlying base plate.

With reference to FIGS. 2, 3a and 3b, the distribution manifold 31 includes a plurality of hollow stem members 33 for channeling cooling fluid supplied to the distribution manifold 31. The stem members 33 may be in the form of capillary tubes, spray nozzles, misting nozzles or a combination thereof. Each stem member 33 preferably includes a series of outlets 35 through which cooling fluid, which may be atomised, is dispersed in liquid phase into the cooling fluid channels/cavities 13 and subsequently onto the wall surfaces 29 of the channels/cavities 13. In this respect, the series of outlets 35 are preferably distributed along an elongate length of each stem member 33. The positioning and dimensions of the stem members 33 is dependent upon the shape of the moulding surface 30 forming the moulding space 27. The hollow stem members 33 may include end caps 37 having outlets 35 therein. Further, as shown in FIGS. 3a and 3b, each hollow stem member 33 may be integrally formed on a base member 39 which seats on the base plate 32 of the distribution manifold 31.

In use, the one or more thermocouples 16 can be positioned at or near the wall surfaces 29, 29' of the cooling fluid cavities 13 to measure the surface temperature. In order to form a moulded product, moulding cycle hot polymer is introduced into the moulding space 27 forming the required moulded article. Thermal energy is transferred to the mould resulting in an increase in the temperature of the wall surfaces 29, 29' of the cooling fluid cavities/channels. The thermocouple(s) 16 register the temperature increase and the controller 20, activates the one or more fluid pumps 19 to supply cooling fluid to the cooling fluid cavities 13, 13' located behind the moulding surfaces 30, 30'. The cooling fluid which enters the cooling fluid cavities 13 via the outlets 35 in the hollow stem members 33 vaporise under the effect of low pressure created within the fluid circuit by the vacuum pump 17, resulting in a reduction in the temperature of the moulding surface 30. The vapours are then channeled back to the cooling system 1 via the cooling fluid return line(s) 9. When the desired moulding surface temperature is reached, the coolant supply is stopped by the controller 20 stopping operation of the one or more fluid pumps 19.

The vapours from the cooling fluid return line(s) 9 pass to the heat exchanger 11 and condense from contact with the cooling surfaces of the heat exchanger 11. The condensate formed is then collected and passed via a connecting line 15 into the supply tank 5. At all times, the vacuum gauge 18 monitors the pressure within the closed fluid circuit and when necessary the controller 20 activates the vacuum pump 17 to further evacuate the closed cooling fluid circuit thereby further lowering the pressure within. The preferred option is to have the vacuum pump 17 constantly in operation and to regulate the vacuum level by opening and closing an outlet vent 22 of the pump 17 when necessary. However, depending upon the pump technology and vacuum level required, it is possible to switch the pump ON and OFF when required. If the entire system is totally 'leak proof' the pump 17 may only be needed to prime the system.

In order to ensure that the one or more cooling fluid cavities/channels 13, 13' remain at all times substantially free of cooling fluid in liquid phase, the mould assembly 3 may further include at least one dedicated drain port 43 for draining residual cooling fluid in the cooling fluid cavities 13, 13' which has not vaporised. In this regard, the one or more drain ports 43 are preferably located in a side wall of the cooling fluid cavities 13 13', for example the wall surface 29, 29' of the cavities 13, 13' and are operatively connected to the fluid supply tank 5, thereby enabling the fluid to be returned to the supply tank 5. In this regard, the evaporative cooling assembly 1 may further includes one or more drain lines 44 connected to the drain port(s) 43 and fluid supply tank 5 to facilitate the return of liquid to the supply tank 5. Alternatively, the one or more fluid return lines 9 may be suitably connected at the bottom rather than the top of the cooling fluid cavities 13, 13' to permit the draining of residual cooling fluid in the cooling fluid cavities 13, 13' which has not vaporised.

The heat exchanger 11 is also preferably connected to a chilled water supply (not illustrated) for cooling purposes. The temperature of the chilled water provided to the heat exchanger 11 is preferably below the temperature of vaporisation of the cooling fluid, which is preferably water, which circulates in the closed fluid circuit of the cooling system 1. This is necessary for condensing the vapours returned from the mould via the fluid return line(s) 9 to the heat exchanger 11. The size of the heat exchanger 11 and the flow of chilled water must be sufficient to condense all of the returning vapours, otherwise the pressure in the cooling system 1 will increase and the mould temperature will vary accordingly. The chilled water advantageously circulates continuously through the heat exchanger 11. The temperature of the chilled water supply can also be modulated to regulate the pressure in the closed fluid circuit.

The desired cooling temperature for the mould assembly 3 dictates the temperature and pressure requirements of the cooling system 1. The temperature of the mould assembly 3 can be regulated by using A) a set pressure level in the cooling system 1, or B) using a controlled flow of vaporised water in the system 1.

A) Cooling Using a Set Pressure Level

As an example of operation, if the desired mould temperature is 20° C., the pressure in the cooling system 1 can be set by the controller to 23 mbar (ie the vapour pressure of water at 20° C.) and the temperature of the cooling fluid in the supply tank 5 kept at 20° C. or slightly less, for example by controlling the chilled water supply provided to the heat exchanger 11 (above 20° C. the cooling water would evaporate in the cooling fluid supply tank 5). The cooling water in liquid phase is supplied (in sufficient quantity) to the surfaces to be cooled, ie the wall surfaces 29, 29' of the cooling fluid cavities 13, 13'. During the injection/packing process, heat from the polymer is transferred to the moulding surfaces 30, 30' increasing its temperature. When the moulding surface 30, 30' temperature is above 20° C., the water in contact with the wall surface 29, 29' of the cooling fluid cavity 13, 13' vaporises and extracts the heat energy from the metal of the wall surface 29, 29'. When the cooling fluid cavity wall surface temperature reaches 20° C., the water is no longer vaporised and can be returned via the cooling fluid return line 9 or dedicated drain line 43 (when provided) to the supply tank 5, and/or the cooling fluid supply pump 19 can be stopped. In this mode of operation, the one or more thermocouples 16 in the mould assembly 3 are not necessary for operation of the cooling system 1.

B) Cooling Using Flow Control of Vaporised Water

In another example, if the desired mould temperature is 20° C., the pressure in the cooling system 1 can be set to below 23 mbar, preferably between 7 to 20 mbar. The temperature of the cooling fluid in the supply tank 5 can then be set by the controller 20 to the corresponding temperature of vaporisation, i.e. 1° C. if the pressure is 7 mbar, 13° C. if the pressure is 15 mbar, and 18° C. if the pressure is 20 mbar. The mould is then regulated to a temperature of 20° C. by the quantity of cooling fluid to be vaporised that is applied to the mould. The flow of cooling water to the mould is regulated by the controller 20. During the mould injection/packing process the heat from the polymer is transferred to the mould surface increasing its temperature, when above 20° C. the cooling water flow is activated at a constant or variable rate (determined by the controller 20). The water in contact with the cooling cavity surfaces 29, 29' vaporises and extracts the heat energy from the metal of the cavity surface 29, 29'. When the temperature of the cooling cavity surface 29, 29' reaches 20° C., the cooling water flow is interrupted. With both methods, the cooling rate can be modulated within a moulding cycle by regulating the water flow, i.e. it is possible, by reducing the amount of water supplied or by creating an intermittent flow, to change the cooling rate to match the resin rate of crystallisation or PVT curves.

The cooling system 1 of the present invention is advantageously able to regulate the temperature of the mould assembly 3 at a set cooling rate and can be cycled to provide cooling at set times during a moulding cycle, which is ideal for a heating and cooling moulding process. The regulation of the mould assembly 3 at a set cooling rate is also particularly advantageous for crystalline materials.

The cooling system 1 of the present invention is particularly well suited to heating of the mould using inductive heating. The mould can be heated using induction coils until the desired temperature for moulding is reached. The chosen polymer can then be injected into the heated mould and the cooling process subsequently commenced at anytime during injection or packing. The cooling system 1 can be deactivated once the mould/plastic component reaches the desired cooling temperature. The table below provides an indication, by polymer type, of the volume of cooling fluid (water) required to cool a mould down from the injection temperature to the desired mould cooling temperature.

| Polymer | Specific heat (J/Kg/° C.) | Mould Injection Temp (° C.) | Mould Cooling Temp (° C.) | Required water (cm³) per (g) of polymer |
| --- | --- | --- | --- | --- |
| LDPE | 2530 | 180 | 30 | 0.168 |
| HDPE | 2750 | 230 | 30 | 0.244 |
| PA6 | 2600 | 250 | 50 | 0.230 |
| PA66 | 2600 | 280 | 50 | 0.265 |
| PA11 | 2600 | 270 | 50 | 0.253 |
| PC | 1710 | 280 | 80 | 0.152 |
| PS | 2050 | 220 | 50 | 0.154 |
| ABS | 2150 | 240 | 70 | 0.162 |
| PMMA | 2440 | 250 | 70 | 0.195 |

The cooling system 1 is also advantageously independent of the mould assembly 3 and does not have to be dedicated to one mould. In this respect, the cooling fluid supply and return line(s) 7, 9 can be connected to the mould assembly 3 using quick connectors for ease of installation and removal. This advantageously reduces the cost of evaporative cooling of the mould assembly 3 as the cooling system 1 can be used with any one of a number of different mould assemblies 3.

The energy dissipated from the moulding surface 30 is directly proportional to the amount of coolant vaporised upon contact with the wall surfaces 29, 29' of the cooling fluid cavities 13, 13'. As the flow rate of coolant in the closed fluid circuit is regulated by the one or more fluid pumps 19, it is possible to accurately predict cooling fluid cavity 13, 13' temperatures and cooling time. This is not possible with evaporative cooling systems in which the cooling fluid cavities contain a substantial amount of cooling fluid in liquid phase stored at the bottom of the cavity.

If the closed fluid circuit is not entirely vacuum sealed or a leak occurs due to movement of a mould component under high injection moulding pressure, the closed fluid circuit can be evacuated in most instances by the vacuum pump 17 without interrupting mould production and with minimal downtime.

Although the invention has been described herein in detail, it will be understood by those skilled in the art that variations may be made thereto without departing from the spirit of the invention or the scope of the appended claims.

The claims defining the invention are as follows:
1. An evaporative cooling system in combination with a mould assembly, the system comprising:
a cooling fluid supply source, wherein the cooling fluid supply source is a cooling fluid supply tank for containing cooling fluid,
at least one cooling fluid supply line connected to the cooling fluid supply source, the cooling fluid supply line being connectable to a mould assembly to thereby supply cooling fluid in liquid phase, from the cooling fluid supply source, onto wall surfaces of at least one cooling fluid cavity of the mould assembly via a series of outlets associated with the cooling fluid supply line, the series of outlets having nozzles configured to disperse atomised droplets of the cooling liquid, the mould assembly comprising a first mould part having a mould core plate, said wall surfaces being defined by one side of the mould core plate, wherein an opposite side of the mould core plate defines a moulding surface of a space within which in use, a moulded article is formed, heat from the mould assembly being removed by evaporation of the cooling fluid upon contact with the wall surfaces of the at least one cooling fluid cavity,
at least one cooling fluid return line and a heat exchanger connected thereto, the cooling fluid return line being connectable to the at least one cooling fluid cavity of the mould assembly to thereby transfer cooling fluid evaporated in the mould assembly to the heat exchanger,
the heat exchanger being operatively connected to the cooling fluid supply source to return cooling fluid condensed in the heat exchanger to the cooling fluid supply source,
wherein in use, the cooling fluid supply source, at least one cooling fluid supply line, at least one cooling fluid cavity, at least one cooling fluid return line, and heat exchanger collectively define a closed fluid circuit through which cooling fluid circulates,
and wherein the system further includes:
at least one temperature sensor for measuring a temperature of at least one of the mould assembly and a temperature of the cooling fluid,
a vacuum generator for providing below atmospheric pressure within the closed fluid circuit,
a vacuum measuring device for measuring a pressure within the closed fluid circuit,
a controller for regulating rate of heat removal from the mould assembly, and
at least one cooling fluid pump for pumping cooling fluid from the cooling fluid supply source to the cooling fluid supply line, the flow of fluid within the closed fluid circuit being controlled by the controller via operation of the at least one cooling fluid pump, wherein the at least one cooling fluid pump is contained within the cooling fluid supply tank,
wherein the system further comprises at least one drain line returning cooling fluid in liquid phase from the at least one cooling fluid cavity of the mould assembly to the cooling fluid supply source, and the mould assembly includes at least one drain port in the one side of the mould core plate of the first mould part, the at least one drain port connecting to the at least one drain line to drain residual cooling fluid in the at least one cooling fluid cavity which has not vaporised back to the cooling fluid supply source,
and wherein in use, the controller regulates the rate of heat removal from the mould assembly by controlling at least one of flow of fluid and pressure within the fluid circuit in response to at least one of a) temperature measurements from the at least one temperature sensor, and b) pressure measurements from the vacuum measuring device, such that the at least one cavity remains substantially free of cooling fluid in the liquid phase with cooling fluid supplied via the outlets evaporating upon contact with the wall surfaces of the at least one cooling fluid cavity.

2. An evaporative cooling system in combination with a mould assembly as claimed in claim 1 wherein the vacuum generator is a vacuum pump which in use, evacuates the closed fluid circuit to provide a sub atmospheric pressure in the circuit between approximately 1 mbar (100 Pa) and 950 mbar, the pressure within the circuit being controlled by the controller via operation of the vacuum pump.

3. An evaporative cooling system in combination with a mould assembly, as claimed in claim 1 wherein the cooling pump is submerged in the cooling fluid contained in the cooling fluid supply tank.

4. An evaporative cooling system in combination with a mould assembly, as claimed in claim 1 wherein the at least one drain line in use, is part of the closed fluid circuit.

5. An evaporative cooling system in combination with a mould assembly, as claimed in claim 1 wherein the first mould part further comprises a distribution manifold, the cooling fluid supply line supplying cooling fluid to the at least one cooling fluid cavity of the first mould part via the distribution manifold.

6. An evaporative cooling system in combination with a mould assembly, as claimed in claim 5 wherein the distribution manifold is at least in part housed within the first mould part with the at least one cooling fluid cavity being defined between the distribution manifold and the second side of the mould core plate of the first mould part.

7. An evaporative cooling system in combination with a mould assembly, as claimed in claim 5 wherein the distribution manifold comprises a plurality of hollow stem members for channelling cooling fluid supplied to the distribution manifold, each stem member comprising a series of outlets having nozzles configured to disperse atomised droplets of cooling fluid into the at least one cooling fluid cavity.

8. An evaporative cooling system in combination with a mould assembly, as claimed in claim 7 wherein the series of outlets are distributed along an elongate length of each stem member.

9. An evaporative cooling system in combination with a mould assembly, as claimed in claim 1 wherein the heat exchanger is operatively connected to a chilled water supply.

10. An evaporative cooling system in combination with a mould assembly, as claimed in claim 2 further comprising a cold trap for preventing evaporated cooling fluid from entering the vacuum pump during evacuation of the closed fluid circuit.

11. An evaporative cooling system in combination with a mould assembly, as claimed in claim 1 wherein at least one of the temperature sensors is a thermocouple positioned to measure the temperature of the surface of the at least one cooling fluid cavity.

12. An evaporative cooling system in combination with a mould assembly, the combination comprising a closed fluid circuit through which cooling fluid circulates, the circuit comprising:
  a cooling fluid supply source for storing cooling fluid, wherein the cooling fluid supply source is a cooling fluid supply tank for containing cooling fluid,
  at least one cooling fluid cavity of the mould assembly,
  at least one cooling fluid supply line for supplying cooling fluid in liquid phase, from the cooling fluid supply source, onto wall surfaces of the at least one cooling fluid cavity of the mould assembly via a series of outlets having nozzles configured to disperse atomised droplets of the cooling liquid, the mould assembly comprising a first mould part having a mould core plate, said wall surfaces being defined by one side of the mould core plate, wherein an opposite side of the mould core plate defines a moulding surface of a space within which in use, a moulded article is formed, heat from the mould assembly being removed by evaporation of the cooling fluid upon contact with the wall surfaces of the at least one cooling fluid cavity,
  at least one cooling fluid return line and a heat exchanger, the cooling fluid return line transferring cooling fluid evaporated in the mould assembly to the heat exchanger, the heat exchanger condensing the evaporated cooling fluid,
  a connecting line between the heat exchanger and the cooling fluid supply tank, the cooling fluid condensed in the heat exchanger being returned to the cooling fluid supply tank via the connecting line,
  the system comprising:
  at least one temperature sensor for measuring at least one of a temperature of the mould assembly and a temperature of the cooling fluid,
  a vacuum generator for providing below atmospheric pressure within the closed fluid circuit,
  a vacuum measuring device for measuring a pressure within the closed fluid circuit,
  a controller for regulating the rate of heat removal from the mould assembly by controlling at least one of flow of fluid and pressure within the closed fluid circuit in response to temperature and pressure measurements, and
  at least one cooling fluid pump for pumping cooling fluid from the cooling fluid supply source to the cooling fluid supply line, the flow of fluid within the closed fluid circuit being controlled by the controller via operation of the at least one cooling fluid pump, wherein the at least one cooling fluid pump is contained within the cooling fluid supply tank,
  wherein the system further comprises at least one drain line returning cooling fluid in liquid phase from the at least one cooling fluid cavity of the mould assembly to the cooling fluid supply source, and the mould assembly comprises at least one drain port in said one side of the mould core plate, the at least one drain port connecting to the at least one drain line to drain residual cooling fluid in the at least one cooling fluid cavity which has not vaporised back to the cooling fluid supply source,
  and wherein in use, the controller regulates the rate of heat removal from the mould assembly, such that the at least one or more cooling fluid cavity remains substantially free of cooling fluid in the liquid phase with cooling fluid supplied via the outlets evaporating upon contact with wall surfaces of the one or more cooling fluid cavities.

13. An evaporative cooling system in combination with a mould assembly, the system comprising:
  a cooling fluid supply source,
  at least one cooling fluid supply line connected to the cooling fluid supply source, the cooling fluid supply line being connectable to a mould assembly to thereby supply cooling fluid in liquid phase, from the cooling fluid supply source, onto wall surfaces of at least one cooling fluid cavity of the mould assembly via a series of outlets associated with the cooling fluid supply line, the series of outlets having nozzles configured to disperse atomised droplets of the cooling liquid, the mould assembly comprising a first mould part having a mould core plate, said wall surfaces being defined by one side of the mould core plate, wherein an opposite side of the mould core plate defines a moulding surface of a space within which in use, a moulded article is formed, heat from the mould assembly being removed by evaporation of the cooling fluid upon contact with the wall surfaces of the at least one cooling fluid cavity, at least one cooling fluid return line and a heat exchanger connected thereto, the cooling fluid return line being connectable to the at least one cooling fluid cavity of the mould assembly to thereby transfer cooling fluid evaporated in the mould assembly to the heat exchanger, the heat exchanger being operatively connected to the cooling fluid supply source to return cooling fluid condensed in the heat exchanger to the cooling fluid supply source, wherein in use, the cooling fluid supply source, at least one cooling fluid supply line, at least one cooling fluid cavity, at least one cooling fluid return line, and heat exchanger collectively define a closed fluid circuit through which cooling fluid circulates, and wherein the system further includes:

at least one temperature sensor for measuring a temperature of at least one of the mould assembly and a temperature of the cooling fluid, at least one of said at least one temperature sensor being a thermocouple positioned to measure the temperature of the surface of the at least one cooling fluid cavity, a vacuum generator for providing below atmospheric pressure within the closed fluid circuit, a vacuum measuring device for measuring a pressure within the closed fluid circuit, and a controller for regulating rate of heat removal from the mould assembly, wherein the system further comprises at least one drain line returning cooling fluid in liquid phase from the at least one cooling fluid cavity of the mould assembly to the cooling fluid supply source, and the mould assembly includes at least one drain port in the one side of the mould core plate of the first mould part, the at least one drain port connecting to the at least one drain line to drain residual cooling fluid in the at least one cooling fluid cavity which has not vaporised back to the cooling fluid supply source, and wherein in use, the controller regulates the rate of heat removal from the mould assembly by controlling at least one of flow of fluid and pressure within the fluid circuit in response to at least one of a) temperature measurements from the at least one temperature sensor, and b) pressure measurements from the vacuum measuring device, such that the at least one cavity remains substantially free of cooling fluid in the liquid phase with cooling fluid supplied via the outlets evaporating upon contact with the wall surfaces of the at least one cooling fluid cavity.

14. An evaporative cooling system in combination with a mould assembly, the combination comprising a closed fluid circuit through which cooling fluid circulates, the circuit comprising:

a cooling fluid supply source for storing cooling fluid, at least one cooling fluid cavity of the mould assembly, at least one cooling fluid supply line for supplying cooling fluid in liquid phase, from the cooling fluid supply source, onto wall surfaces of the at least one cooling fluid cavity of the mould assembly via a series of outlets having nozzles configured to disperse atomised droplets of the cooling liquid, the mould assembly comprising a first mould part having a mould core plate, said wall surfaces being defined by one side of the mould core plate, wherein an opposite side of the mould core plate defines a moulding surface of a space within which in use, a moulded article is formed, heat from the mould assembly being removed by evaporation of the cooling fluid upon contact with the wall surfaces of the at least one cooling fluid cavity, at least one cooling fluid return line and a heat exchanger, the cooling fluid return line transferring cooling fluid evaporated in the mould assembly to the heat exchanger, the heat exchanger condensing the evaporated cooling fluid, a connecting line between the heat exchanger and the cooling fluid supply tank, the cooling fluid condensed in the heat exchanger being returned to the cooling fluid supply tank via the connecting line, the system comprising:

at least one temperature sensor for measuring at least one of a temperature of the mould assembly and a temperature of the cooling fluid, at least one of said at least one temperature sensor being a thermocouple positioned to measure the temperature of the surface of the at least one cooling fluid cavity, a vacuum generator for providing below atmospheric pressure within the closed fluid circuit, a vacuum measuring device for measuring a pressure within the closed fluid circuit, and a controller for regulating the rate of heat removal from the mould assembly by controlling at least one of flow of fluid and pressure within the closed fluid circuit in response to temperature and pressure measurements, wherein the system further comprises at least one drain line returning cooling fluid in liquid phase from the at least one cooling fluid cavity of the mould assembly to the cooling fluid supply source, and the mould assembly comprises at least one drain port in said one side of the mould core plate, the at least one drain port connecting to the at least one drain line to drain residual cooling fluid in the at least one cooling fluid cavity which has not vaporised back to the cooling fluid supply source, and wherein in use, the controller regulates the rate of heat removal from the mould assembly, such that the at least one or more cooling fluid cavity remains substantially free of cooling fluid in the liquid phase with cooling fluid supplied via the outlets evaporating upon contact with wall surfaces of the one or more cooling fluid cavities.

15. A method of removing heat from a mould assembly comprising a first mould part having a mould core plate, the method comprising the steps of:

providing a closed fluid circuit for cooling fluid to circulate therethrough, the closed fluid circuit comprising:

a cooling fluid supply source for storing cooling fluid, wherein the cooling fluid supply source is a cooling fluid supply tank for containing cooling fluid, at least one cooling fluid supply line connected to the cooling fluid supply source, at least one cooling fluid cavity of a mould assembly connected to the cooling fluid supply line, at least one cooling fluid return line connected to the at least one cooling fluid cavity, a heat exchanger connected to the cooling fluid return line, and a connecting line between the heat exchanger and the cooling fluid supply source;

connecting the cooling fluid supply line to the mould assembly;

supplying cooling fluid in liquid phase from the cooling fluid supply source onto wall surfaces of at least one cooling fluid cavity of the mould assembly via a series of outlets associated with the cooling fluid supply line, the series of outlets having nozzles dispersing atomised droplets of the liquid, said wall surfaces being defined by one side of the mould core plate, wherein an opposite side of the mould core plate defines a moulding surface of a space within which in use, a moulded article is formed, heat from the mould assembly being removed by evaporation of the cooling fluid upon contact with the wall surfaces of the at least one cooling fluid cavity, transferring cooling fluid evaporated in the mould assembly to a heat exchanger via the cooling fluid return line, the heat exchanger condensing the evaporated cooling fluid, returning cooling fluid condensed in the heat exchanger to the cooling fluid supply source via the connecting line connected to the cooling fluid supply source, measuring a temperature of at least one of the mould assembly and the cooling fluid using at least one temperature sensor, providing below atmospheric pressure within the closed fluid circuit with a vacuum generator, measuring the pressure within the closed fluid circuit using a vacuum measuring device, and regulating the rate of heat removal from the mould assembly by controlling flow of at least one of fluid and pressure within the closed fluid circuit in response to temperature and pressure measurements, said flow of the at least one fluid being controlled at via operation of at least one cooling fluid pump, said at least one cooling fluid pump for pumping cooling fluid from the cooling fluid supply source to the cooling fluid supply line, wherein the at least one cooling fluid pump is contained within the cooling fluid supply tank, wherein the method further comprises:

draining residual fluid in the at least one cooling fluid cavity which has not vaporised via at least one drain port in said one side of the mould core plate of the first mould part, the at least one drain port being connecting to the at least one drain line of the system to return cooling fluid in liquid phase from the mould assembly back to the cooling fluid supply source, and regulating the rate of heat removal from the mould assembly by controlling flow of at least one of fluid and pressure within the closed fluid circuit in response to temperature and pressure measurements such that, the at least one cooling fluid cavity remains substantially free of cooling fluid in the liquid phase with cooling fluid supplied via outlets evaporating upon contact with the wall surfaces of the at least one cooling fluid cavity.

16. A method of removing heat from a mould assembly comprising a first mould part having a mould core plate, the method comprising the steps of:

providing a closed fluid circuit for cooling fluid to circulate therethrough using the evaporative cooling system in combination with the mould assembly of claim 14, the closed fluid circuit comprising:

the cooling fluid supply source for storing cooling fluid, the at least one cooling fluid supply line connected to the cooling fluid supply source, the at least one cooling fluid cavity of a mould assembly connected to the cooling fluid supply line, the at least one cooling fluid return line connected to the at least one cooling fluid cavity, the heat exchanger connected to the cooling fluid return line, and the connecting line between the heat exchanger and the cooling fluid supply source;

connecting the cooling fluid supply line to the mould assembly;

supplying cooling fluid in liquid phase from the cooling fluid supply source onto wall surfaces of at least one cooling fluid cavity of the mould assembly via the series of outlets associated with the cooling fluid supply line, the series of outlets having nozzles dispersing atomised droplets of the liquid, said wall surfaces being defined by one side of the mould core plate, wherein the opposite side of the mould core plate defines the moulding surface of a space within which in use, a moulded article is formed, heat from the mould assembly being removed by evaporation of the cooling fluid upon contact with the wall surfaces of the at least one cooling fluid cavity, transferring cooling fluid evaporated in the mould assembly to the heat exchanger via the cooling fluid return line, the heat exchanger condensing the evaporated cooling fluid, returning cooling fluid condensed in the heat exchanger to the cooling fluid supply source via the connecting line connected to the cooling fluid supply source, measuring a temperature of at least one of the mould assembly and the cooling fluid using the at least one temperature sensor, at least one of said at least one temperature sensor being a thermocouple positioned to measure the temperature of the surface of the at least one cooling fluid cavity, providing below atmospheric pressure within the closed fluid circuit with the vacuum generator, measuring the pressure within the closed fluid circuit using the vacuum measuring device, and regulating the rate of heat removal from the mould assembly by controlling flow of at least one of fluid and pressure within the closed fluid circuit in response to temperature and pressure measurements, wherein the method further comprises:

draining residual fluid in the at least one cooling fluid cavity which has not vaporised via the at least one drain port in said one side of the mould core plate of the first mould part, the at least one drain port being connecting to the at least one drain line of the system to return cooling fluid in liquid phase from the mould assembly back to the cooling fluid supply source, and regulating the rate of heat removal from the mould assembly by controlling flow of at least one of fluid and pressure within the closed fluid circuit in response to temperature and pressure measurements such that the at least one cooling fluid cavity remains substantially free of cooling fluid in the liquid phase with cooling fluid supplied via outlets evaporating upon contact with the wall surfaces of the at least one cooling fluid cavity.

* * * * *